United States Patent
Lin (10) Patent No.: US 7,859,862 B2
(45) Date of Patent: Dec. 28, 2010

(54) APPARATUS AND METHOD FOR REGULATING CONSTANT OUTPUT VOLTAGE AND CURRENT ON PRIMARY SIDE IN A FLYBACK CONVERTER

(75) Inventor: Tzu-Chen Lin, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 284 days.

(21) Appl. No.: 12/232,325

(22) Filed: Sep. 16, 2008

(65) Prior Publication Data

US 2009/0073725 A1 Mar. 19, 2009

(30) Foreign Application Priority Data

Sep. 17, 2007 (TW) .............................. 96134739 A (51) Int. Cl.
*H02M 3/335* (2006.01)
*H02H 7/122* (2006.01)

(52) U.S. Cl. ................................. 363/21.12; 363/56.01

(58) Field of Classification Search ................... 363/16, 363/21.12, 21.13, 21.15, 21.16, 21.18, 56.01, 363/56.1, 56.11

See application file for complete search history.

(56) References Cited

U.S. PATENT DOCUMENTS

| | | | | |
|---|---|---|---|---|
| 5,699,237 A * | 12/1997 | Seragnoli | ...................... | 363/19 |
| 5,995,385 A * | 11/1999 | Shimamura | .............. | 363/21.16 |
| 6,118,675 A * | 9/2000 | Lionetto et al. | .......... | 363/21.13 |
| 6,456,020 B1* | 9/2002 | Park | .......................... | 315/411 |
| 6,944,034 B1* | 9/2005 | Shteynberg et al. | ....... | 363/21.13 |
| 7,746,673 B2* | 6/2010 | Grant et al. | .............. | 363/21.18 |
| 2007/0121351 A1* | 5/2007 | Zhang et al. | ............. | 363/21.12 |
| 2010/0157636 A1* | 6/2010 | Li et al. | ...................... | 363/124 |

* cited by examiner

*Primary Examiner*—Matthew V Nguyen
(74) *Attorney, Agent, or Firm*—Rosenberg Klein & Lee (57) ABSTRACT

A voltage detector circuitry extracts a signal on primary side of a transformer in a flyback converter, which is proportional to the output voltage of the converter without voltage drop on the rectifier diode and leakage inductance effect on the transformer, and good output regulation is achieved without optocoupler. To accurately detect the output voltage on the primary side, the knee point of the voltage on an auxiliary winding of the transformer is detected. A current limit proportional to the input voltage of the converter is produced from the voltage on an auxiliary winding for stabilizing the output current in constant current mode.

12 Claims, 11 Drawing Sheets

APPARATUS AND METHOD FOR REGULATING CONSTANT OUTPUT VOLTAGE AND CURRENT ON PRIMARY SIDE IN A FLYBACK CONVERTER

FIELD OF THE INVENTION

The present invention is related generally to a switching mode power supply and, more particularly, to an apparatus and method for output voltage and current regulation of a flyback converter.

BACKGROUND OF THE INVENTION

Figure 1:
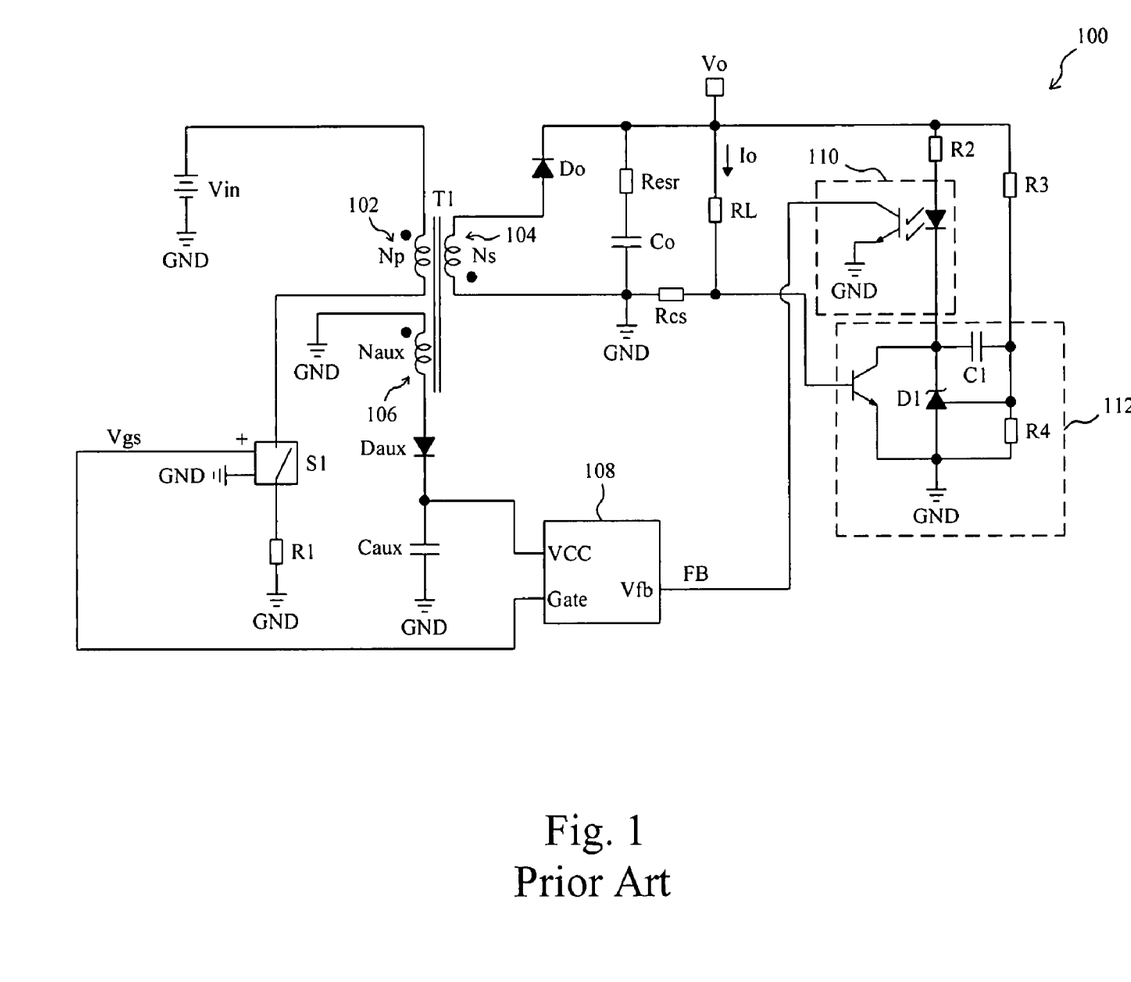
FIG. 1 is a circuit diagram of a conventional flyback converter.
Figure 2:
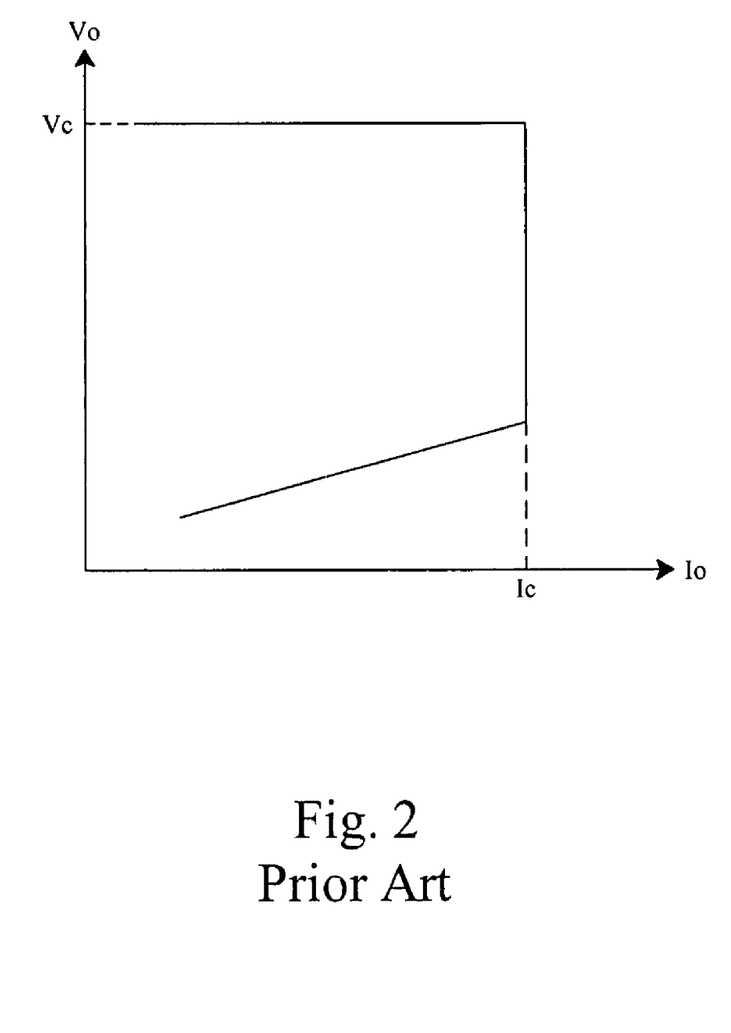
FIG. 2 is a diagram to show the output characteristic of the flyback converter shown in FIG. 1.

In a conventional off-line switching mode power supply, in order to regulate output voltage and current of the power supply, output voltage and current sensors, such as shunt regulator, current sense resistor and opto-coupler to deliver feedback signal with hazard voltage isolation, are needed on secondary side. In further detail, FIG. 1 shows a conventional flyback converter 100, in which a transformer T1 has a primary winding 102 coupled between a voltage source Vin and a power switch S1, a secondary winding 104 coupled between a rectifier diode Do and a ground terminal GND on secondary side, and an auxiliary winding 106 coupled between a ground terminal GND and a rectifier diode Daux on primary side, and a controller 108 provides a control signal Vgs to switch the power switch S1 to convert the input voltage Vin to an output voltage Vo for a load RL. By switching the power switch S1, power is delivered from the primary winding 102 to the secondary winding 104 and thus produces current that will be rectified by the rectifier diode Do and charge the output capacitor Co to produce the output voltage Vo on the power output. On the other hand, the auxiliary winding 106 on the primary side produces current that will be rectified by the diode Daux and charges a capacitor Caux to produce a direct current (DC) voltage on the capacitor Caux, for serving as a power source for the controller 108. FIG. 2 is a diagram to show the output characteristic of the flyback converter 100, which has constant voltage mode and constant current mode. As shown by the curve, the flyback converter 100 operates at constant output voltage Vc when the output load RL is less than a threshold, and once the output load RL increases, the load current Io would be limited at Ic and the output voltage Vo drops following the load impedance RL. In order to regulate the output voltage Vo and current Io, as shown in FIG. 1, current sense resistor Rcs, opto-coupler 110 and shunt regulator 112 are required on the secondary side to detect the output voltage Vo and current Io to produce a feedback signal FB for the controller 108, and these devices will increase the size and cost of the flyback converter 100.

To overcome the above problem, the output voltage Vo and current Io are alternatively extracted on the primary side of the transformer T1 or by using the auxiliary winding 106, for example, disclosed by U.S. Pat. Nos. 5,438,499, 6,480,399, 6,721,192, 6,781,357, 6,833,692, 6,862,194, 6,967,472 and 6,977,824. However, due to the forward voltage of the rectifier diode Do and the leakage inductance of the transformer T1, these arts could not accurately obtain the output information.

SUMMARY OF THE INVENTION

An object of the present invention is to provide an alternative way to get an accurate feedback signal on primary side and regulate output indirectly in a flyback converter. Following the feedback signal, an approximated constant output current is achieved.

In particular, the present invention discloses an apparatus and method for regulating constant output voltage and current on primary side in a flyback converter.

According to the present invention, a flyback converter includes a transformer having a primary winding coupled between a power input and a power switch, a secondary winding coupled to a power output through a rectifier diode, and an auxiliary winding on primary side, and voltage detector circuitry is coupled to the auxiliary winding to extract a signal therefrom which is proportional to the output voltage of the converter without voltage drop on the rectifier diode and leakage inductance effect on the transformer. Good regulation is so achieved without any opto-coupler on secondary side. Specifically, the knee point of the voltage on the auxiliary winding is detected to represent the output voltage and thus the output voltage is accurately detected on the primary side.

According to an aspect of the present invention, a knee voltage detector samples and holds the knee voltage on the auxiliary winding. The knee voltage will be proportional to the output voltage of the converter when the current of the rectifier diode is zero.

According to another aspect of the present invention, a current limit curve is programmed according to the knee voltage, which has values proportional to the input voltage received by the power input when the power switch is on. A constant output current is achieved with the programmed input power.

According to yet another aspect of the present invention, a constant current controller produces a signal from the knee voltage, and a switch is coupled at the output of the constant current controller to disable the constant current controller when the knee voltage is lower than a threshold, such that the converter can operate at maximum power out during start-up.

According to still another aspect of the present invention, circuitry is added for propagation delay compensation, and thus the propagating effect is minimized to control the output load as a constant current.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 3:
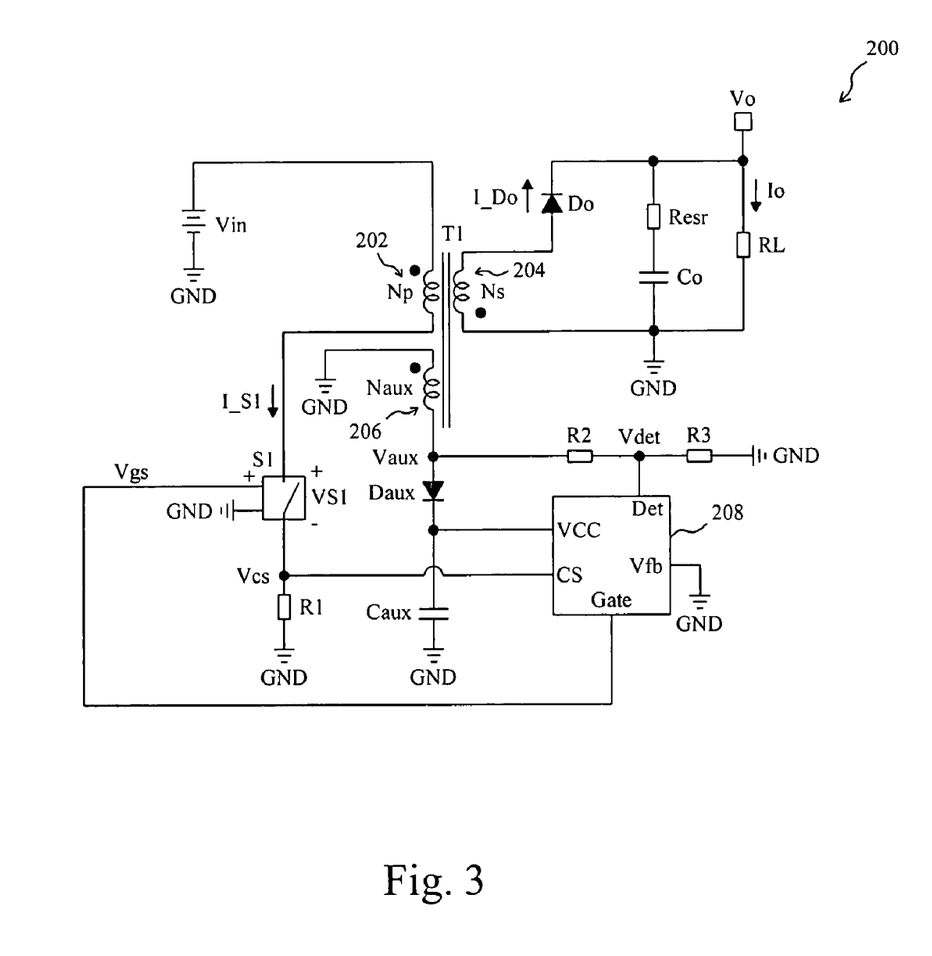
FIG. 3 is a circuit diagram of a flyback converter using an apparatus and method of the present invention.
Figure 4:
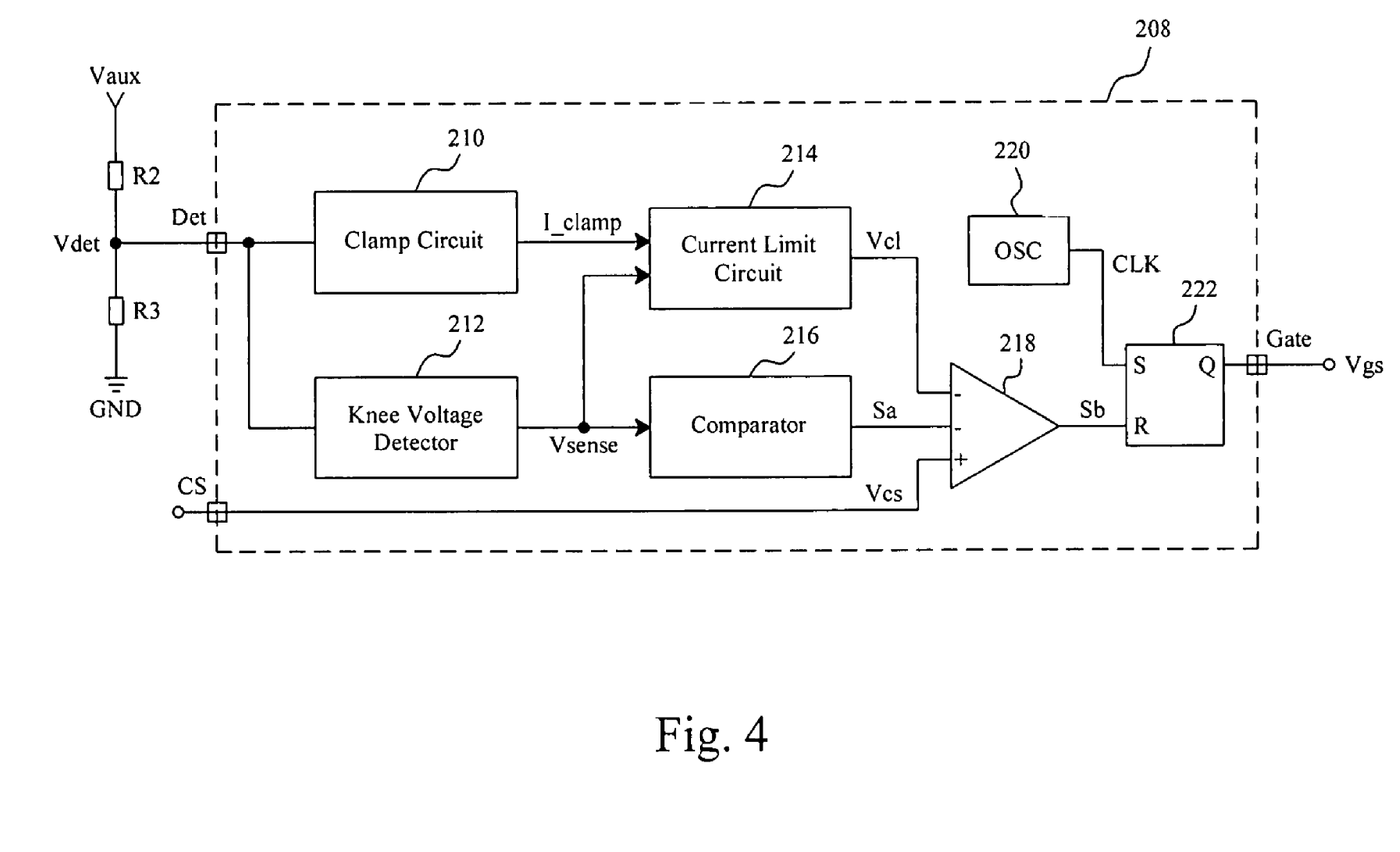
FIG. 4 is an embodiment according to the present invention.

FIG. 3 is a circuit diagram of a flyback converter 200, in which, as in the conventional flyback converter 100, a transformer T1 has a primary winding 202 coupled between a power input Vin and a power switch S1, a secondary winding 204 coupled between a rectifier diode Do and a ground terminal GND on secondary side, and an auxiliary winding 206 coupled between a ground terminal GND and a diode Daux on primary side, and a controller 208 provides a control signal Vgs to switch the power switch S1 to convert the input voltage Vin to an output voltage Vo. In order to regulate the output voltage Vo and current Io of the flyback converter 200, two resistors R2 and R3 are serially connected between the auxiliary winding 206 and a ground terminal GND on the primary side, serving as a voltage divider to divide the voltage Vaux on the auxiliary winding 206 to produce a voltage Vdet for the controller 208. Since the voltage Vaux is related to the output voltage Vo, output information of the flyback converter 200 could be accurately extracted from the voltage Vdet, and for this the controller 208 is different from those used in prior arts. FIG. 4 is a circuit diagram of an embodiment according to the present invention, in which a clamp circuit 210 is coupled to the node Vdet between the resistors R2 and R3 by a detect pin Det of the controller 208, to clamp the voltage Vdet on the node Vdet to a level not lower than zero for protecting the chip of the controller 208, and the combination of the resistors R2 and R3 and the clamp circuit 210 is used as voltage detector circuitry to monitor the voltage Vaux on the auxiliary winding 206 to generate a current clamp signal I_clamp proportional to the input voltage Vin. On the other hand, a knee voltage detector 212 detects a knee value of the voltage Vdet to generate a voltage sense signal Vsense proportional to the output voltage Vo. A current limit circuit 214 generates a current limit signal Vcl according to the current clamp signal I_clamp and the voltage sense signal Vsense, to provide current limit threshold for the switched current I_S1 in the power switch S1, a comparator 216 compares the voltage sense signal Vsense with a reference signal Vref to generate a signal Sa, and a comparator 218 generates a signal Sb according to the signals Vcl and Sa as well as a current sense signal Vcs which is related to the switched current I_S1. An oscillator 220 provides a clock CLK, and a flip-flop 222 produces the control signal Vgs which has a duty determined according to the clock CLK and the output Sb of the comparator 218. In constant voltage mode, the voltage sense signal Vsense can be controlled at a constant value and the controller 208 will indirectly regulate and thereby stabilize the output voltage Vo. In constant current mode, the current limit signal Vcl is used to stabilize the output current Io.

Figure 5:
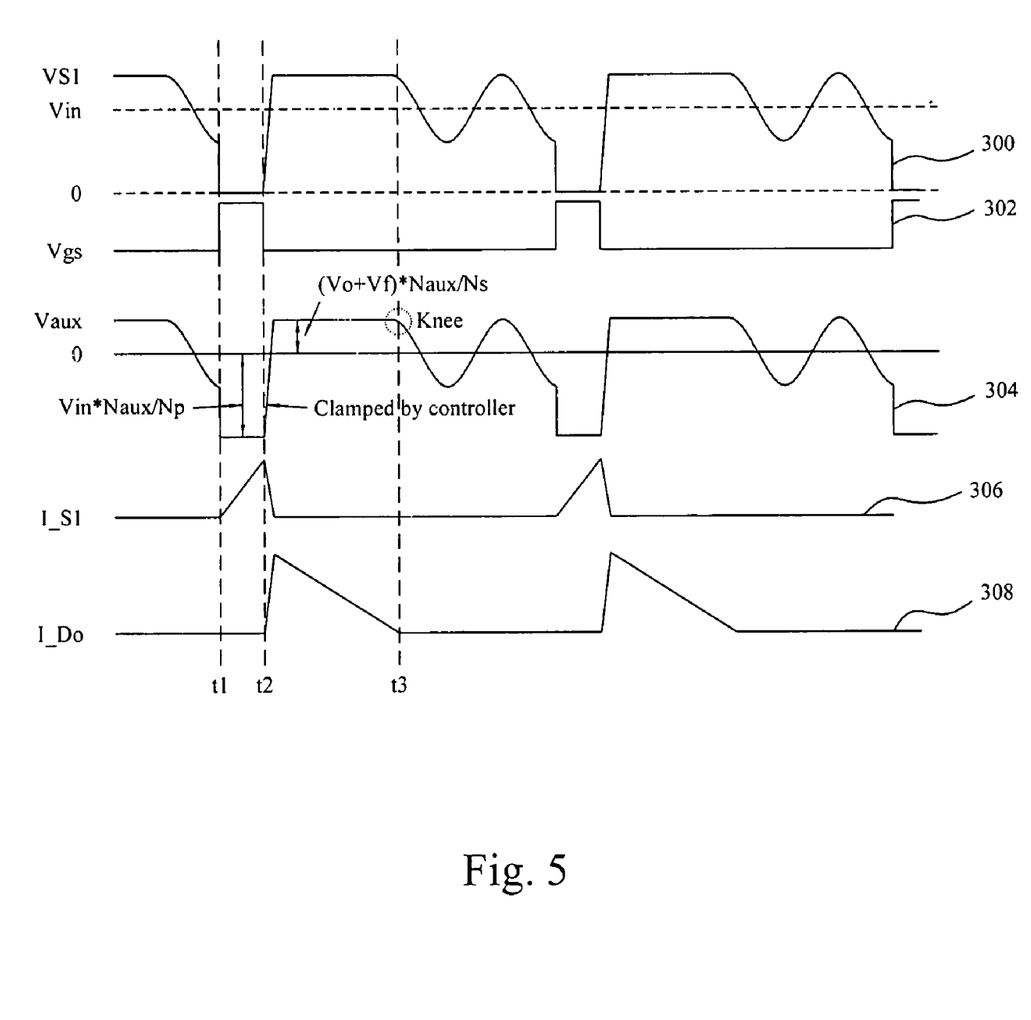
FIG. 5 is a waveform diagram to show corresponding signals in the flyback converter of FIG. 3.
Figure 6:
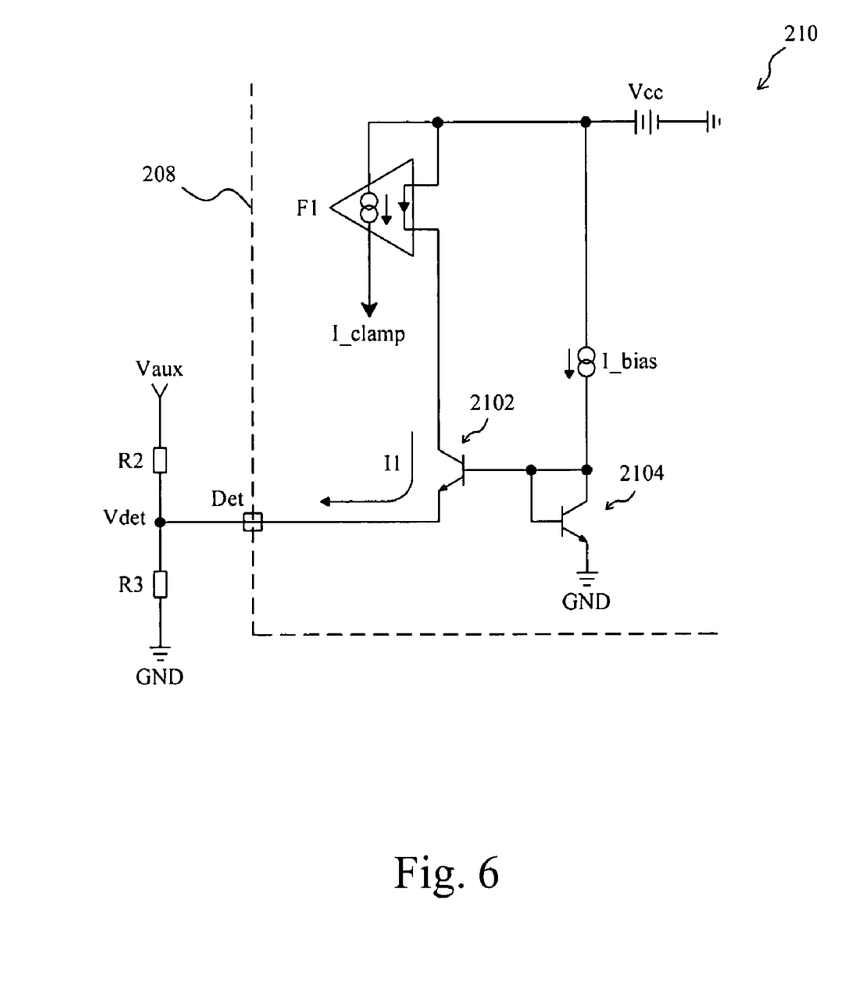
FIG. 6 is an embodiment for the clamp circuit shown in FIG. 4.

FIG. 5 is waveform diagram to show corresponding signals in the flyback converter 200 of FIG. 3, in which waveform 300 represents the voltage VS1 on the power switch S1, waveform 302 represents the control signal Vgs, waveform 304 represents the voltage Vaux on the auxiliary winding 206, waveform 306 represents the switched current I_S1 in the power switch S1, and waveform 308 represents the rectified current I_Do flowing through the rectifier diode Do. FIG. 6 is an embodiment for the clamp circuit 210 shown in FIG. 4, in which a combination of transistors 2102 and 2104 and a bias current source I_bias is used to limit the voltage Vdet to a level not lower than zero, and an amplifier F1 amplifies the current I1 flowing through the transistor 2102 to generate the current clamp signal I_clamp. Referring to FIGS. 5 and 6, during the period between time t1 and time t2, the control signal Vgs provided by the controller 208 is high and thus turns on the power switch S1, so that the voltage VS1 on the power switch S1 is zero and the switched current I_S1 in the power switch S1 increases. Meanwhile, the voltage Vaux on the auxiliary winding 206 will be $$Vaux = -Vin \times Naux/Np, \quad [\text{Eq-1}]$$

where Naux is the turns of the auxiliary winding 206 and Np is the turns of the primary winding 202. Since the voltage Vaux is negative and the voltage Vdet is limited by the clamp circuit 210 to a level not lower than zero, the current I1 will flow from the transistor 2102 to the auxiliary winding 206 through the resistor R2, and thus it will be $$I1 = (Vin \times Naux/Np)/R2. \quad [\text{Eq-2}]$$

Assuming that the amplifier F1 has unit gain, the current I1 will produce the current clamp signal $$I\_clamp = (Vin \times Naux/Np)/R2. \quad [\text{Eq-3}]$$

Therefore, while the power switch SI is on, the current clamp signal I_clamp is proportional to the input voltage Vin. Then, during the period between time t2 and time t3, the control signal Vgs provided by the controller 208 is low and thus turns off the power switch S1, and as a result, the secondary winding 204 of the transformer T1 provides the current I_Do that flows through the rectifier diode Do. At this time, the voltage Vaux on the auxiliary winding 206 is $$Vaux = (Vo + Vf) \times Naux/Ns, \quad [\text{Eq-4}]$$

where Vf is the forward voltage of the rectifier diode Do and Ns is the turns of the secondary winding 204. Since the voltage Vaux is divided by the resistors R2 and R3 to produce the voltage Vdet, the voltage Vdet will be related to the output voltage Vo.

Once the current I_Do is zero, for example at time t3 in FIG. 5, the diode Do turns off and the voltage Vf thereof is almost zero. At this moment, as shown by the equation Eq-4, the voltage Vaux is proportional to the output voltage Vo, since the load effect of the rectifier diode Do and the DC resistance of the secondary winding 204 can be ignored. When the diode Do stops conducting current, the voltage VS1 on the power switch S1 would oscillate as a damping sinusoidal waveform which is caused by the output capacitance Coss of the power switch S1 and the magnetic inductance of the transformer T1. Therefore, as long as the knee point of the voltage Vaux at which the rectifier diode Do turns off and the voltage VS1 starts to oscillate is found, such as at time t3 in FIG. 5, it could obtain a signal independent of the voltage Vf of the rectifier diode Do and proportional to the output voltage Vo.

Figure 7:
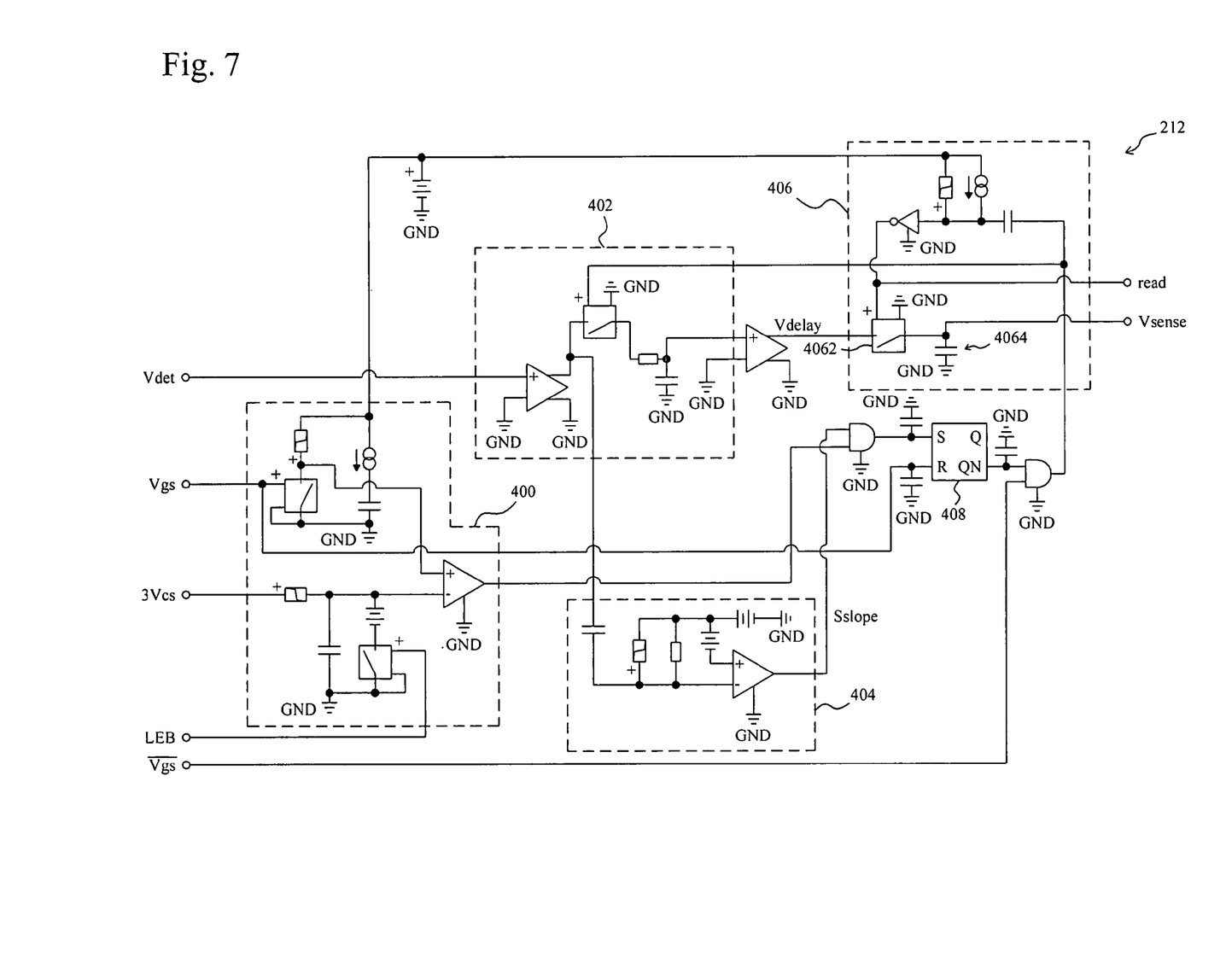
FIG. 7 is an embodiment for the knee voltage detector shown in FIG. 4.
Figure 8:
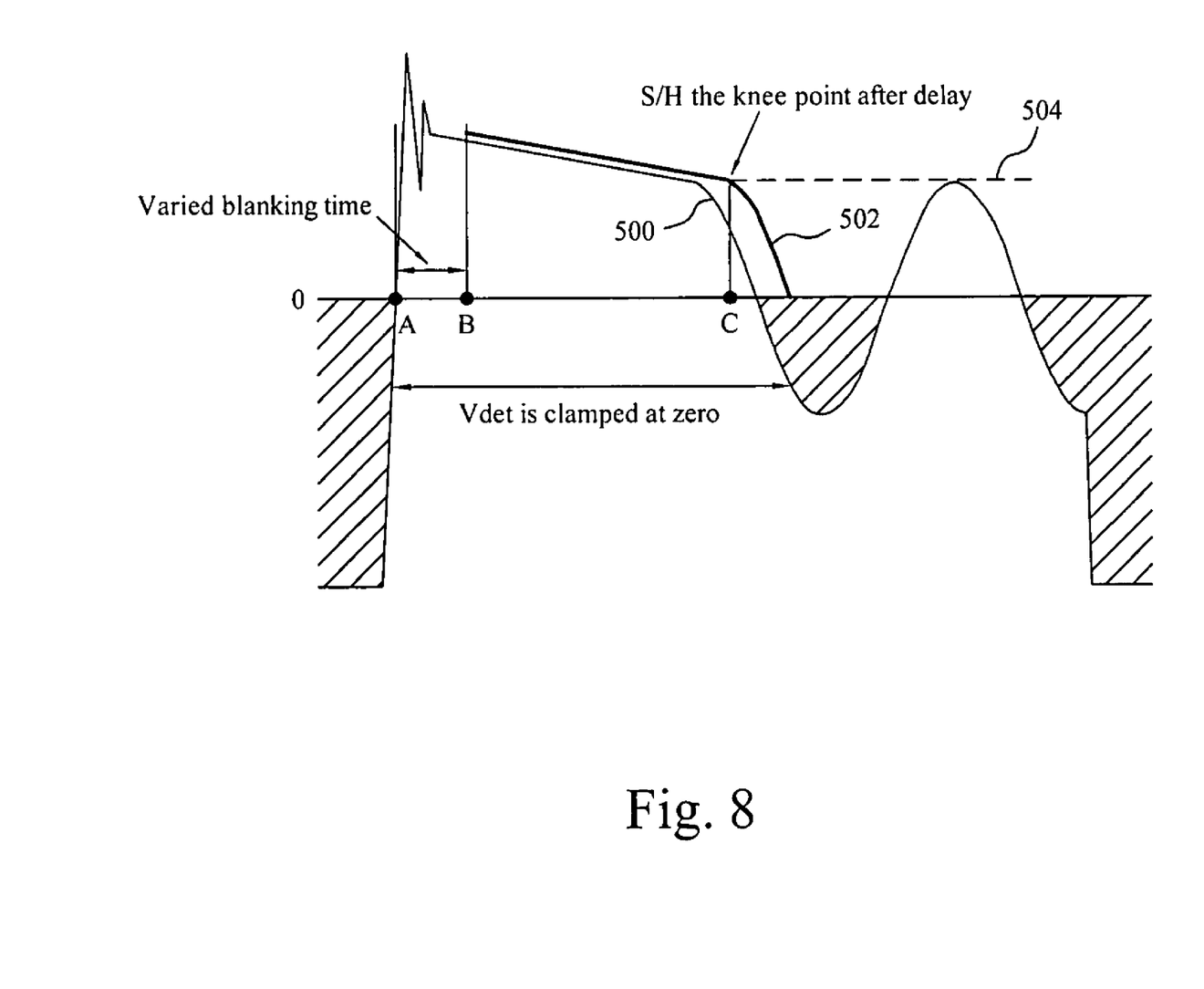
FIG. 8 is a diagram to illustrate the operation of the knee voltage detector shown in FIG. 7.

The knee voltage detector 212 will sample and hold the knee voltage on the auxiliary winding 206. The knee voltage is proportional to the output voltage Vo when the current I_Do of the rectifier diode Do is zero. FIG. 7 is an embodiment for the knee voltage detector 212 shown in FIG. 4 and FIG. 8 is a diagram to illustrate the operation thereof. In FIG. 8, waveform 500 represents the voltage Vdet, which has a portion clamped at zero and eliminated by the clamp circuit 210. As shown in FIG. 7, the knee voltage detector 212 has an RC delay circuit 402 to delay the voltage Vdet to generate a delayed voltage Vdelay, which has the waveform 502 shown in FIG. 8, and a knee detector 404 to detect the knee point of the voltage Vdet. The knee detector 404 is composed by a slope detector and a comparator, and the knee point is determined by monitoring the slope of the voltage Vdet. When the slope of the voltage Vdet is less than a threshold, for example a value corresponding to the point C shown in FIG. 8, the knee detector 404 will assert a signal Sslope to trigger a flip-flop 408. A sample and hold circuit 406 will sample and hold the delayed voltage Vdelay when a knee point is detected, and a switch 4062 thereof will be turned on by the output QN of the flip-flop 408 to sample the knee value of the delayed voltage Vdelay. The sample and hold circuit 406 has a capacitor 4064 to store the knee value of the delayed voltage Vdelay to generate the voltage sense signal Vsense, as shown by the waveform 504 in FIG. 8. By using the delayed voltage Vdelay, instead of the voltage Vdet, it can prevent the influence of propagation delay in the comparator of the knee detector 404. In addition, a blanking circuit 400 is used to provide a varied blanking time in response to the peak of the switched current I_S1, such as the period between points A and B in FIG. 8, to blank the voltage spike on the voltage Vdet caused by the leakage inductance of the transformer T1. Since the voltage sense signal Vsense is not affected by the voltage of the rectifier diode Do and the leakage inductance of the transformer T1, and is proportional to the output voltage Vo, it could indirectly regulate the output voltage Vo in constant voltage mode by controlling the voltage sense signal Vsense at a constant value. In other embodiments, the knee value of the voltage Vdelay may be determined using the difference between the voltages Vdet and Vdelay. For example, the sample and hold circuit 406 can be triggered when the difference between the voltages Vdet and Vdelay reaches a threshold value.

In discontinuous conduction mode (DCM), a flyback converter may provide output power $$Pout = Vo \times Io = Eff \times Pin = Eff \times 0.5 \times Lm \times Ipk^2 \times fs, \quad [\text{Eq-5}]$$

where Eff is the efficiency of the flyback converter, Pin is the input power of the flyback converter, Lm is the magnetic inductance of the transformer, fs is the switching frequency of the power switch, and Ipk is the peak value of the switched current in the power switch. Assuming that the efficiency Eff of the flyback converter 200 remains constant under all circumstances and the parameters Lm and fs are also constant, to maintain the output current Io at a constant value, the switched current I_S1 is needed to have the peak $$Ipk = K \times Vo^{1/2}, \quad [\text{Eq-6}]$$

where K is a constant. In addition, the peak Ipk of the switched current I_S1 may be also determined by $$Ipk = Vcl + (Ttp \times Vin/Lm), \quad [\text{Eq-7}]$$

where Ttp is the propagation delay from the time the switched current I_S1 reaches the preset limit Vcl till the time the power switch S1 is fully turned off. For a stable output current Io, according to the equations Eq-6 and Eq-7, it requires the current limit signal $$Vcl = K \times Vo^{1/2} - (Ttp \times Vin/Lm). \quad [\text{Eq-8}]$$

Figure 9:
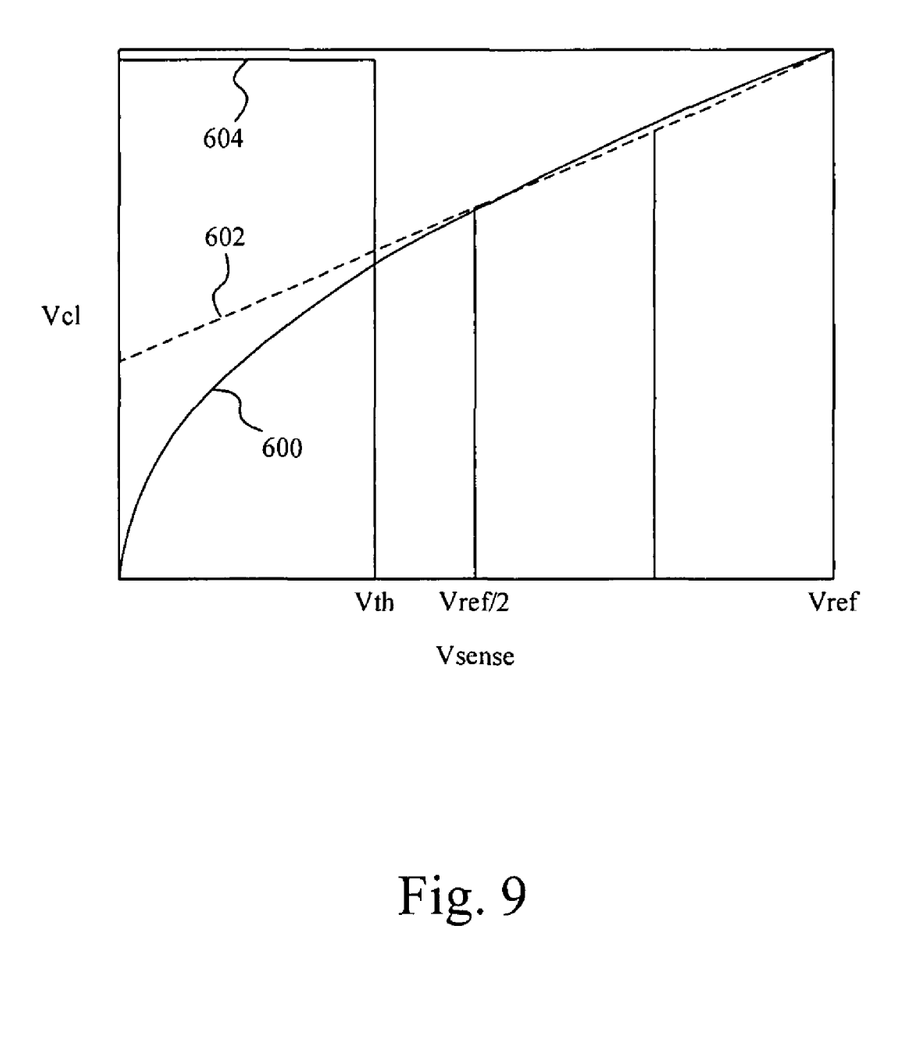
FIG. 9 is a diagram to show an ideal current limit signal and an approximated one for stable output current in a flyback converter.

Since the voltage sense signal Vsense is proportional to the output voltage Vo, it may use the voltage sense signal Vsense to replace the output voltage Vo in the equation Eq-8 and have the current limit signal $$Vcl = K' \times Vsense^{1/2} - (Ttp \times Vin/Lm), \quad [\text{Eq-9}]$$

where K' is a constant. FIG. 9 is a diagram to show the current limit signal Vcl, in which curve 600 represents the current limit signal Vcl programmed by the equation Eq-9. However, the equation Eq-9 is difficult to implement with circuitry. For simplicity, it may select a first-order equation approximating the equation Eq-9 for the current limit signal Vcl. In this embodiment, the curve 600 is approximated by a first-order equation in the interval of the voltage sense signal Vsense between Vref/2 and Vref as $$Vcl = Kc + Kb \times (Vsense - Ka) - Kd \times I\_clamp, \quad [\text{Eq-10}]$$

where Ka, Kb, Kc and Kd are all constants. The curve 602 shown in FIG. 9 represents the current limit signal Vcl obtained from the equation Eq-10.

Figure 10:
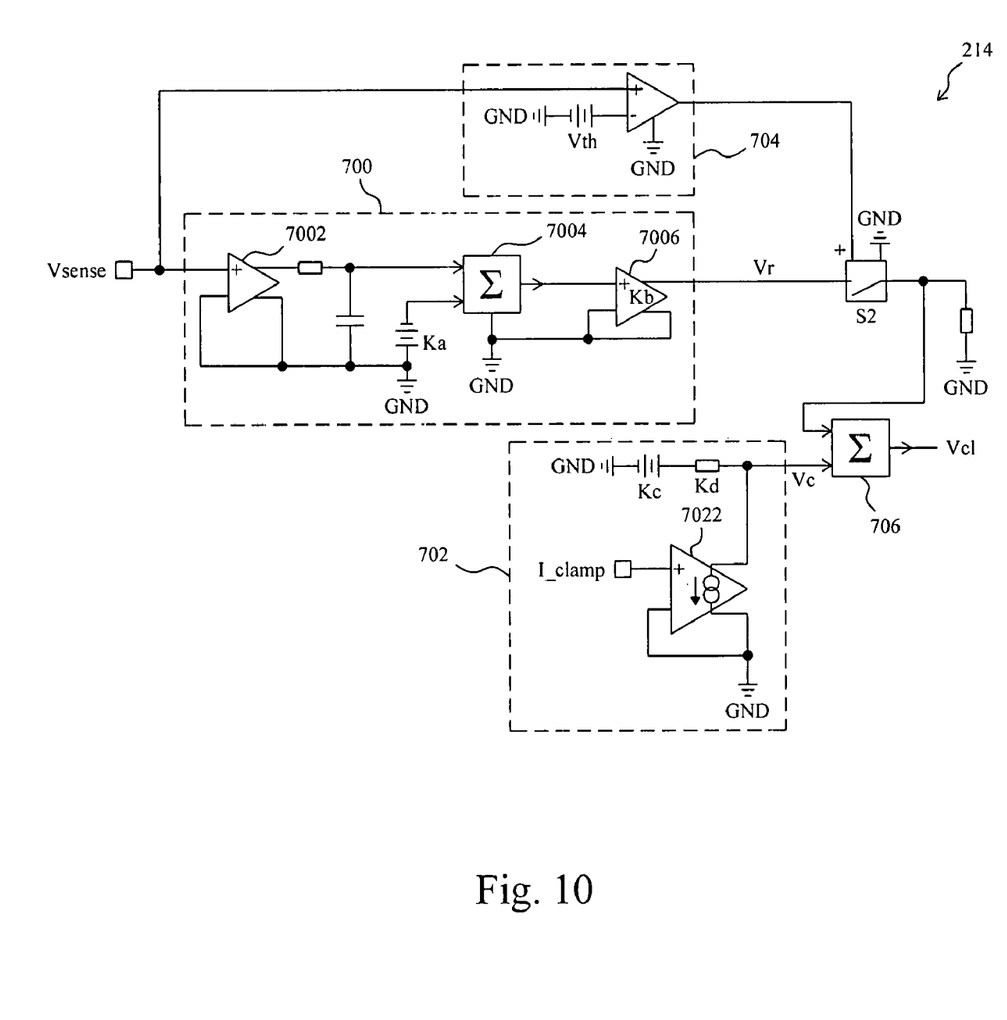
FIG. 10 is a circuit diagram to implement the approximated current limit signal shown in FIG. 9.
Figure 11:
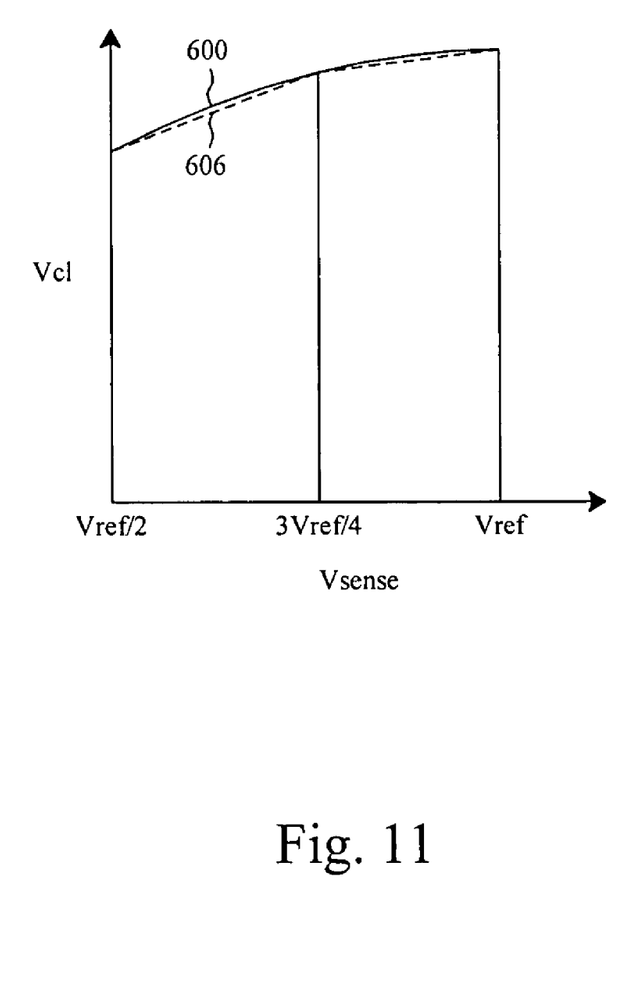
FIG. 11 is a diagram to show a bi-slope curve approximating the ideal current limit signal of FIG. 9.

A current limit curve may be determined according to the knee voltage and has values proportional to the input voltage Vin. A constant output current Io may be achieved with programmed input power. FIG. 10 is a circuit diagram to implement the equation Eq-10 for the current limit circuit 214 shown in FIG. 4, which has a constant current controller 700 to produce a signal Vr which is a function of the voltage sense signal Vsense. In the constant current controller 700, the voltage sense signal Vsense is sent to an adder 7004 via a buffer 7002 to combine with a bias voltage Ka, and an amplifier 7006 having a gain Kb amplifies the output of the adder 7004 to generate the voltage Vr=(Vsense−Ka)×Kb, which is a signal varying with the output voltage Vo. To eliminate the effect caused by the propagation delay Ttp, a propagation delay compensator 702 is further added for propagation delay compensation, by injecting the current clamp signal I_clamp to a resistor Kd by an amplifier 7022 having unit gain, and biased with a preset voltage Kc, and the circuitry 702 will have the output Vc=Kc−Kd×I_clamp. An adder 706 combines the voltages Vr and Vc to generate the current limit signal Vcl following the equation Eq-10. A mechanism may be further added to cut-in the constant current control with a threshold following the voltage sense signal Vsense. This action provides maximum output power during start-up to settle output in a minimum duration. As shown in FIG. 10, a switch S2 is inserted between the constant current controller 700 and the adder 706, and is controlled by disable circuitry 704. The disable circuitry 704 has a comparator to compare the voltage sense signal Vsense with a threshold Vth. When the voltage sense signal Vsense is lower than the threshold Vth, for example during the system starts up, the disable circuitry 704 will turn off the switch S2 to disconnect the path to send the signal Vr to the adder 706, so that the current limit signal Vcl becomes positively saturated, as shown by a curve 604 in FIG. 9, and thus the flyback converter 200 operates with maximum output power. While the curve 602 in this embodiment has a single slope, the curve 600 may be approximated by a curve having multiple slopes. For example, as shown in FIG. 11, a curve 606 having two slopes is used to approximate the curve 600, of which the first slope applies to the interval of the voltage sense signal Vsense between Vref/2 and 3Vref/4, and the second slope applies to the interval of the voltage sense signal Vsense between 3Vref/4 and Vref.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for regulating constant output voltage and current on primary side in a flyback converter including a transformer having a primary winding coupled between a power input to receive an input voltage and a power switch, a secondary winding coupled to a power output to provide an output voltage through a rectifier diode, and an auxiliary winding on the primary side, the apparatus comprising:

- voltage detector circuitry coupled to the auxiliary winding to generate a first signal proportional to the input voltage when the power switch is on and a second signal related to the output voltage when the power switch is off;
- a knee voltage detector coupled to the voltage detector circuitry to detect a knee point of the second signal to generate a third signal proportional to the output voltage; and
- a current limit circuit coupled to the voltage detector circuitry and the knee voltage detector to generate a fourth signal according to the first and third signals to determine a current limit threshold for a switched current in the power switch;
- wherein the third and fourth signals are used to determine a duty of the power switch.

2. The apparatus of claim 1, wherein the voltage detector circuitry comprises:

- two resistors serially connected to the auxiliary winding to divide the voltage on the auxiliary winding to generate the second signal at a node between the two resistors; and
- a clamp circuit connected to the node between the two resistors to clamp the second signal not lower than a preset value and generate the first signal according to a current flowing from the clamp circuit to the node between the two resistors.

3. The apparatus of claim 1, wherein the knee voltage detector comprises:

- a delay circuit coupled to the voltage detector circuitry to delay the second signal to generate a fifth signal;
- a knee detector coupled to the voltage detector circuitry to assert a sixth signal when a slope of the second signal is less than a threshold; and
- a sample and hold circuit coupled to the delay circuit and knee detector to sample and hold the fifth signal in response to the sixth signal so as to generate the third signal.

4. The apparatus of claim 3, wherein the knee voltage detector further comprises a blanking circuit coupled to the knee detector to provide a varied blanking time to blank noise in the second signal resulted from leakage inductance of the transformer.

5. The apparatus of claim 1, wherein the current limit circuit comprises:

- a propagation delay compensator coupled to the clamp circuit to generate a fifth signal from the first signal for propagation delay compensation;
- a constant current controller coupled to the knee voltage detector to generate a sixth signal from the third signal, which varies with the output voltage; and
- an adder coupled to the propagation delay compensator and constant current controller to combine the fifth and sixth signals to generate the fourth signal.

6. The apparatus of claim 5, wherein the current limit circuit further comprises:

- a switch coupled between the constant current controller and adder; and
- disable circuitry coupled to the switch to disconnect the constant current controller from the adder when the third signal is lower than a threshold.

7. A method for regulating constant output voltage and current on primary side in a flyback converter including a transformer having a primary winding coupled between a power input to receive an input voltage and a power switch, a secondary winding coupled to a power output to provide an output voltage through a rectifier diode, and an auxiliary winding on the primary side, the method comprising the steps of:

- (a) from a voltage on the auxiliary winding, generating a first signal proportional to the input voltage when the power switch is on, and a second signal related to the output voltage when the switch is off;
- (b) detecting a knee point of the second signal to generate a third signal proportional to the output voltage for stabilizing the output voltage in a constant voltage mode; and
- (c) generating a fourth signal according to the first and third signals to determine a current limit threshold for a switched current in the power switch for stabilizing the output current in a constant current mode.

8. The method of claim 7, wherein the step (a) comprises the steps of:

- detecting a current in the auxiliary winding to generate the first signal when the power switch is on; and
- dividing the voltage on the auxiliary winding to generate the second signal when the power switch is off.

9. The method of claim 7, wherein the step (b) comprises the steps of:

- delaying the second signal to generate a fifth signal;
- monitoring a slope of the second signal; and
- generating the third signal by sampling and holding the fifth signal when the slope of the second signal is less than a threshold.

10. The method of claim 9, further comprising the step of providing a varied blanking time to blank noise in the second signal resulted from leakage inductance of the transformer.

11. The method of claim 7, wherein the step (c) comprises the steps of:

- generating a fifth signal from the first signal with a propagation delay compensation;
- generating a sixth signal from the third signal, which varies with the output voltage; and
- combining the fifth and sixth signals to generate the fourth signal.

12. The method of claim 11, further comprising the step of blanking the sixth signal when the third signal is lower than a threshold.

* * * * *